United States Patent
Gillespie et al.

(10) Patent No.: US 6,678,515 B1
(45) Date of Patent: Jan. 13, 2004

(54) METHOD AND SYSTEM FOR CONDITIONALLY ROUTING CALLS

(75) Inventors: Donald E. Gillespie, Boulder, CO (US); David G. Robinson, Boulder, CO (US); Marcus Roman, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 475 days.

(21) Appl. No.: 09/642,420

(22) Filed: Aug. 19, 2000

Related U.S. Application Data

(60) Provisional application No. 60/215,012, filed on Jun. 29, 2000.

(51) Int. Cl.[7] .............................................. H04M 11/10
(52) U.S. Cl. ................. 455/412.1; 455/413; 455/414.2; 455/445
(58) Field of Search ................................ 455/414, 413, 455/415, 416, 417, 445, 433, 432, 461, 428, 435, 412.1, 414.1, 414.2, 446, 466, 426.1, 422.1, 3.04; 379/211.02, 221.01, 220.01, 221.02

(56) References Cited

U.S. PATENT DOCUMENTS

| | | | |
|---|---|---|---|
| 5,329,578 A | | 7/1994 | Brennan et al. |
| 5,504,804 A | * | 4/1996 | Widmark et al. ............ 455/414 |
| 5,878,338 A | * | 3/1999 | Alperovich et al. ......... 455/417 |
| 5,920,812 A | * | 7/1999 | Palviainen .................. 455/417 |
| 6,125,126 A | | 9/2000 | Hallenstål |
| 6,167,256 A | * | 12/2000 | Yla-Outinen et al. ....... 455/417 |
| 6,301,466 B1 | * | 10/2001 | Alperovich et al. ......... 455/428 |
| 6,445,915 B1 | | 9/2002 | Baiyor et al. |
| 6,522,886 B1 | | 2/2003 | Youngs et al. |

\* cited by examiner

Primary Examiner—Nay Maung
Assistant Examiner—John J Lee
(74) Attorney, Agent, or Firm—Townsend and Townsend and Crew LLP

(57) ABSTRACT

A method and system for conditionally forwarding a call for use in a communication network including a switching center in communication with at least one alternative system, and a plurality of subscribers, each subscriber having at least one directory number. The method includes providing a service location register in communication with a switching center, the service location register operative to retrieve stored call termination parameters for each of the subscriber's directory numbers and call information for each incoming call to a directory number, the call termination parameters including call forwarding features. A busy or no answer condition is detected for a call to a directory number and the request is forwarded to the service location register for routing instructions. Service logic is applied to disconnect the call or route the call to at least one alternative system.

20 Claims, 3 Drawing Sheets

METHOD AND SYSTEM FOR CONDITIONALLY ROUTING CALLS

This application is related to co-pending U.S. patent application Ser. No. 09/642,203, filed on Aug. 19, 2000, entitled "Method and System for Conditionally Routing Calls."

TECHNICAL FIELD

This invention relates to a method and system for conditional call forwarding.

BACKGROUND ART

Call forwarding features, namely, Call Forwarding No Answer (CFNA), Call Forwarding Busy Line (CFBL), and Call Forward Default (CFD), are commonly available to wireless network subscribers. When invoked, these features permit calls for which a busy or no answer condition has been detected to be automatically transferred to a corresponding voice mail system. Such voice mail systems enable callers to leave voice messages for wireless subscribers when the subscriber has powered off his or her handset, is out of coverage, is engaged in another wireless call, or for whatever reason, elects not to answer the incoming call. The routing to the voice mail systems in all of these conditions is controlled by the above call forwarding features. These features forward all unanswered incoming calls to a single, fixed destination—a voice mail system.

A prior art wireless communication system is shown in FIG. 1 and designated generally by reference numeral 10. Wireless network 10 includes a Central Office Switch (COS) 12. COS 12 is provided in communication with the Public Switched Telephone Network (PSTN) 14 and one or more subscribers, each having at least one Customer Premises Equipment (CPE) device 16. COS 12 is further provided in communication with a Mobile Switching Center (MSC) 20 and an Intelligent Peripheral (IP) 22. MSC 20 is, in turn, provided in communication with IP 22, a Home Location Register (HLR) 24 and one or more Base Station Controllers (BSCs) 26. Each BSC 26 is provided in communication with one or more Base Stations (BSs) 28. Finally, each BS 28 is provided in communication with one or more mobile handsets 30 each having an assigned calling number known as a Mobile Directory Number (MDN) or Mobile Identification Number (MIN). Each handset 30 also has a preassigned Electronic Serial Number (ESN).

In operation, a call to a mobile subscriber having handset 30 and a preassigned Mobile Directory Number or Mobile Identification Number, whether originated from a wireless network or a wire line network, is forwarded through the Public Switched Telephone Network (PSTN) 14 to COS 12. COS 12 performs a database look-up and identifies the Called Party DN as corresponding to a mobile subscriber. COS 12 forwards the call to the subscriber's home MSC 20. MSC 20 will thereafter launch a query to HLR 24 requesting the location of handset 30, as well as call termination parameters. This request, termed a Location Request Message (LOCREQ) typically includes information such as calling party identification (the subscriber's MDN or MIN) and redirecting party identification, the details of which are well known in the art and need not be discussed in further detail here. Thereafter MSC 20 alerts handset 30 by generating a ringing signal.

In an ANSI-41 network, HLR 24 periodically receives update information regarding the location and call parameters for subscriber 30. This typically occurs whenever subscriber 30 "powers on" or enters a wireless serving area and initiates the registration process. Again, as those skilled in the art will recognize, handset 30 detects the presence of a Base Station (BS) 28 or Base Station Controller (BSC) 26. BS 28 or BSC 26, in turn, alerts the serving MSC, here, MSC 20, that the handset 30 has begun registration. MSC 20 thereafter sends a Registration Notification Message (REGNOT) to HLR 24 requesting call termination parameters for handset 30. HLR 24 then sends a Registration Notification Response Message (regnot) to MSC 20. The regnot provides the above referenced call termination parameters for subscriber 30 including whether the party has subscribed to any call forwarding features such as the above referenced CFBL, CFNA or CFD. MSC 20 then stores this information for subsequent processing.

Single number ring services such as U S West One Number Service™, provide a subscribing party the ability to simultaneously receive a ringing signal from a calling party at a plurality of CPE devices. Although each CPE device has a different calling number or DN, a calling party need only dial a "single" calling number or primary number. Each of the subscriber's DNs for corresponding CPE devices are stored at HLR 24 and cross referenced with the subscriber's primary number. For example, a subscriber may have a primary calling number of (303) 541-4000 and individual Directory Numbers of (303) 672-2985, (303) 672-2781, and (303) 672-2986 corresponding to the subscriber's office, home, and mobile telephones, respectively. A calling party, however, need only dial the primary number (303) 541-4000. Using the primary number, COS 12 will perform a database look up and identify the call as directed to a party that has subscribed to one number service. COS 12 will thereafter forward the call to Intelligent Peripheral (IP) 22. IP 22 will launch a query to HLR 24 requesting the specific DNs corresponding to the primary DN. HLR 24 will perform a suitable database look up and provide this information to IP 22 along with the corresponding call termination parameters for each mobile handset 30. IP 22 will thereafter generate and bridge the calls to all of the subscriber's DNs. Calls to land line or "wired" telephones such as telephone 16 are forwarded over the PSTN 14 to a serving switch such as COS 12 and routed accordingly. Calls to mobile or "wireless" telephones such as handset 30 are forwarded over the wireless network to a serving MSC such as MSC 20.

Regardless if a call to a wireless handset 30 originates from MSC 30 as a direct call, or from IP 22 as part of a one number service product, MSC 20 will initiate a call forward feature if handset 30 is currently engaged in a call or, for any reason, the subscriber fails to answer. This feature sends a Transfer To Number Request Message to HLR 24 requesting further routing instructions. Because HLR 24 is unable to distinguish between calls originating from MSC 20 and calls originating from IP 22, however, all calls will be forwarded to the subscriber's voice mail system.

As readily seen, forwarding a wireless call to a voice mail system in the case of one number service applications is undesirable, unnecessary, and wasteful of network resources.

Consequently, a need has developed for a method and system for conditionally forwarding calls to a wireless subscriber to an alternative device or system such as a voice mail system upon detection of a busy or no answer condition.

DISCLOSURE OF INVENTION

It is a principle object of the present invention to provide a method and system for conditionally forwarding calls to a subscriber to an alternative device or system.

It is a further object of the present invention to provide such a method and system which does not forward calls to a wireless subscriber's voice mail system when such calls originate from a Mobile Switching Center (MSC).

Still further, it is an object of the present invention to provide such a method and system which does not forward calls to a wireless subscriber's voice mail system when such calls originate from an Intelligent Peripheral (IP) or are otherwise launched as part of a one number service.

In carrying out the above objects, there is provided a method for conditional call forwarding to an alternative device or system. The method is specifically adapted for use in a communication network including a switching system such as a Mobile Switching Center (MSC) which is provided in communication with at least one alternative system such as, for example, a Voice Messaging System (VMS), and a plurality of subscribers, each having a handset with a corresponding Mobile Directory Number (MDN). The method includes providing a service location register such as a Wireless Service Location Register (WSLR™) (also called a wireless SCP) in communication with the switching center. The service location register is operative to retrieve stored call termination parameters for each of the subscriber Mobile Directory Numbers and call information for each incoming call to a Mobile Directory Number. The call termination parameters include call forwarding features. The method further includes detecting a busy or no answer condition for a call to a Mobile Directory Number and forwarding a request to the service location register for further routing instructions. The method further includes applying service logic to disconnect the call or route the call to the alternative system.

In a preferred embodiment, the switching system is a Mobile Switching Center (MSC), the at least one alternative system is a Voice Messaging System, and, as indicated above, the Service Location Register is a WSLR™. The call information includes calling party identification and/or redirecting party identification. Further, the request to the WSLRTM comprises a Transfer To Number Request including redirecting reason. The service logic is operative to examine the calling party information and, in particular, the original called number, the calling party identification, redirecting party identification and/or redirecting reason to conditionally determine if voice messaging is applicable. If the call originates from an Intelligent Peripheral therefore indicating that the subscriber's single number service was invoked, the WSLRTM is operative to instruct the MSC to disconnect the call. In contrast, if it is determined that the call was originally placed to the mobile subscriber directly and not redirected by an IP, the voice messaging destination will be returned to the MSC.

In keeping with the invention, any suitable routing criteria may be provided as part of the call termination parameters. For example, only business related calls as determined by the calling party number or any other suitable information or criteria such as time, day or date of call, etc., may be routed to voice mail. Still further, only calls with unrestricted calling party identification may be routed to voice mail. The subscriber's Profile as part of the call termination parameters may also provide for routing to multiple voice mail systems in accordance with any suitable criteria such as, for example, business or personal uses.

In carrying out the above method, there is provided a system including an MSC which is provided in communication with a Service Location Register such as a WSLR™, an IP, and a plurality of subscribers and, more particularly, subscriber handsets. The MSC may be provided in direct communication with the handsets or via appropriate base station controllers and/or base stations as known to those skilled in the art. In keeping with the invention, the WSLR™, which is a network computer containing both Home Location Register (HLR) applications and Wireless Service Control Point (WSCP) applications, is operative to retrieve stored call termination parameters for each of the subscribers in accordance with their Mobile Directory Numbers. The WSLR™ is further operative to retrieve call information for each incoming call to a Mobile Directory Number. Call termination parameters include call forwarding features and the call information includes calling party identification and/or redirecting party identification.

The MSC is operative to detect a busy or no answer condition for a call to a directory number and thereafter forward a request such as a transferred to number request to the WSLR™ for routing instructions. In a preferred embodiment, the request includes redirecting reason. The WSLR™ is further adapted to apply service logic to terminate the call at the directory number or forward it to the Voice Messaging System following examination of the call information. Specifically, the WSLR™ will determine if the call originated from the MSC or if it originated from the IP as part of a simultaneous ring service such as the U S West One Number Service™, these and other objects, features, and advantages of the present invention will become readily apparent with reference to the following description of the drawings wherein like reference numerals correspond to like components.

BEST MODE FOR CARRYING OUT THE INVENTION

Figure 1:
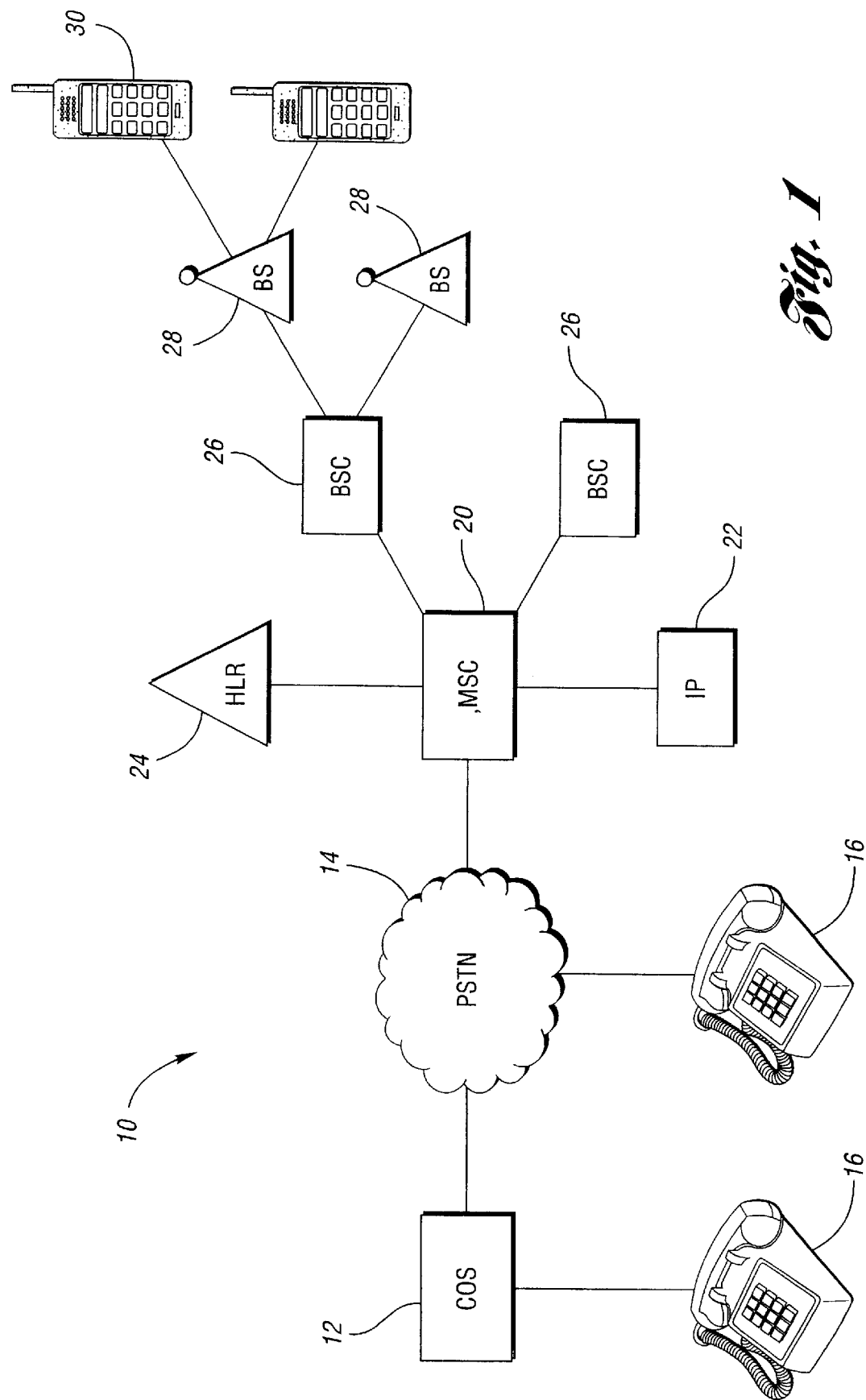
FIG. 1 is a schematic diagram of a prior art wireless network.
Figure 2:
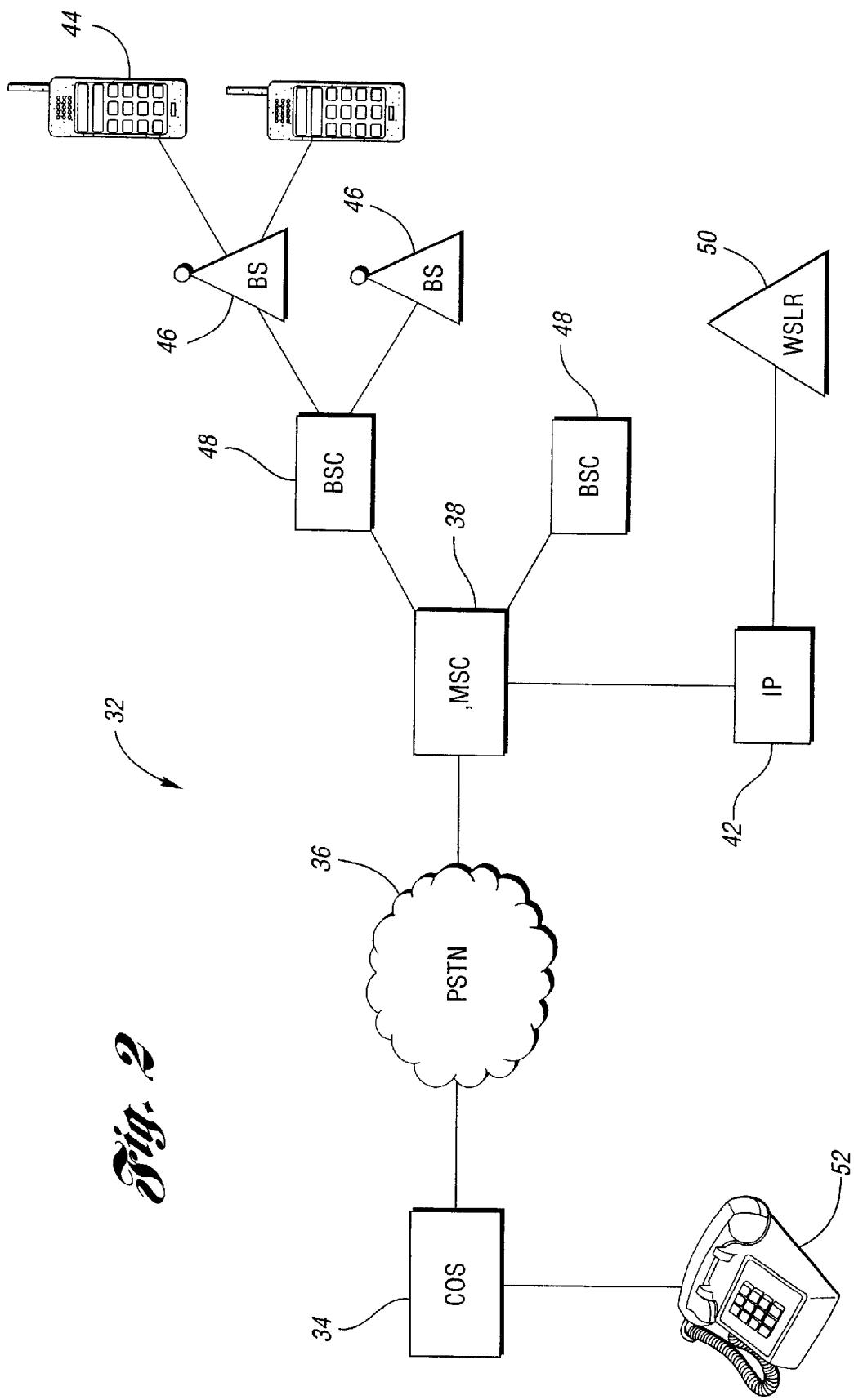
FIG. 2 is a schematic diagram of improved wireless network of the present invention which provides conditional call forwarding to an alternative device or system; and, FIG. 3 is a block diagram of the method steps of the present invention.

With reference to FIG. 2 of the drawings, there is shown an improved wireless network of the present invention which provides for conditional call forwarding of a wireless call to an alternative device or system. The network is designated generally by reference number 32. Like the prior art network 10, network 32 includes one or more Center Office Switches (COS) 34. Each COS 34 is provided in communication with one or more subscriber CPE devices such as telephones 52 via the Public Switched Telephone Network (PSTN) 36. Each COS 34 is further provided in communication with a Mobile Switching Center (MSC) 38, an Intelligent Peripheral (IP) 42, and a plurality of subscribers via handsets 44 each having a corresponding Mobile Directory Number (MDN). Handsets 44 may be provided in direct communication with MSC 38 or may communicate with one or more Base Stations (BSs) 46 or Base Station Controllers (BSCs) 48 which, in turn, are provided in communication with MSC 38. MSC 38 is further provided in communication with Intelligent Peripheral 42 and a Wireless Service Location Register (WSLR™) 50.

As those skilled in the art will recognize, WSLR™ 50 is a network computer containing both Home Location Register (HLR) applications as well as Wireless Service Control Point (WSCP) applications. Similarly, Intelligent Peripheral 42 is a network switching platform that can be equipped with advanced services such as, for example, a simultaneous ring application where incoming calls to the IP 42 are connected with a plurality of wireless handsets 44 and wire line phones 52. Handsets 44 communication with MSC 38 using radio frequencies. Common digital protocols for this transmission activity include Code Division Multiple Access (CDMA) and Time Division Multiple Access (TDMA). Base stations 46 and/or Base Station Controllers 48 communicate with MSC 38 using a base station protocol such as IS-634 or a similar protocol. MSC 38 further communicates with WSLR™ 50 using a signaling protocol such as ANSI-41 or GSM MAP.

As indicated above, in an ANSI-41 network, when a mobile user "powers on" a mobile handset 44, or when a mobile user enters a wireless serving area, handset 44 detects the presence of a Base Station 46 or MSC 38 and begins a registration procedure. Base Station 46 alerts MSC 38 that a handset has begun registration and MSC 38 sends a registration notification message to WSLR™ 50. In the registration notification response, WSLR™ 50 indicates to the MSC 38 that the subscriber has a Call Forwarding feature such as Call Forwarding Busy Line (CFBL), Call Forward No Answer (CFNA) or Call Forward Default (CFD). MSC 38 stores this information in any suitable database such as a Visiting Location Register (VLR) as part of MSC 38 and is operative to retrieve it on request.

All incoming calls to mobile subscriber 44 (whether direct or redirected by IP 42 due to a one number ringing service) are received by MSC 38. MSC 38 queries WSLR™ 50 with a suitable request such as a Location Request Message (LOCREQ) which contains information such as calling party identification and redirecting party identification, requesting further instructions. WSLR™ 50 responds to the request with call termination parameters and the MSC 38 begins alerting handset 44 by generating a ringing signal. If the handset is currently engaged in another call and cannot receive a new call, MSC 38 initiates a Call Forward Busy feature. This feature sends a Transfer To Number Request message containing information, such as redirection reason, to the WSLR™ asking for further instructions.

In contrast to the prior art where all unanswered calls are directed to a Voice Messaging System, WSLR™ 50 applies service logic to "conditionally" apply voice messaging based on routing criteria which is a part of the subscriber's Profile. In the preferred embodiment, the WSLR™ service logic examines the original called number, the calling party identification (the calling party DN), redirecting party identification, and/or redirecting reason to conditionally determine if voice messaging is applicable. More specifically, if the call is coming from the IP 42 and the subscriber's one number service was originally dialed, then WSLR™ 50 instructs MSC 38 to disconnect the call. In contrast, if the call was originally placed to the mobile subscriber directly, and was not redirected by IP 42, then an alternative system such as the Voice Messaging System, destination will be returned to the MSC 38. The alternative system destination is stored as part of the subscriber's call termination Profile and includes a specific address corresponding to a server. In the case of a Voice Messaging System, a specific voice mail address corresponding to a voice mail server is therefore stored.

Similarly, if the mobile user 44 decides not to answer the call, MSC 38 sends the Transfer To Number Request with a different redirection reason. The same method to that described above applies to unanswered calls with the exception that the MSC 38 will initiate a Call Forward No Answer feature.

In keeping with the invention, any suitable call termination parameters may be provided separate and apart from those directed to call forwarding relating to a one number service application. Moreover, any suitable alternative device or system may be used for routing purposes, including, but not limited to, a voice mail system. For example, a subscriber's Profile may provide that only business related calls be routed to an alternative system or device such as voice mail. Such calls may be identified by the system in any suitable manner including cross reference to a calling party number, as well as the time, day or date of the call. A subscriber's call forwarding Profile may further provide that only calls with unrestricted calling party identification (calling party information not blocked out) be redirected. Still further, a subscriber may have multiple alternative systems (including multiple voice mail systems) for which calls may be forwarded in accordance with any suitable criteria including that indicated above.

Figure 3:
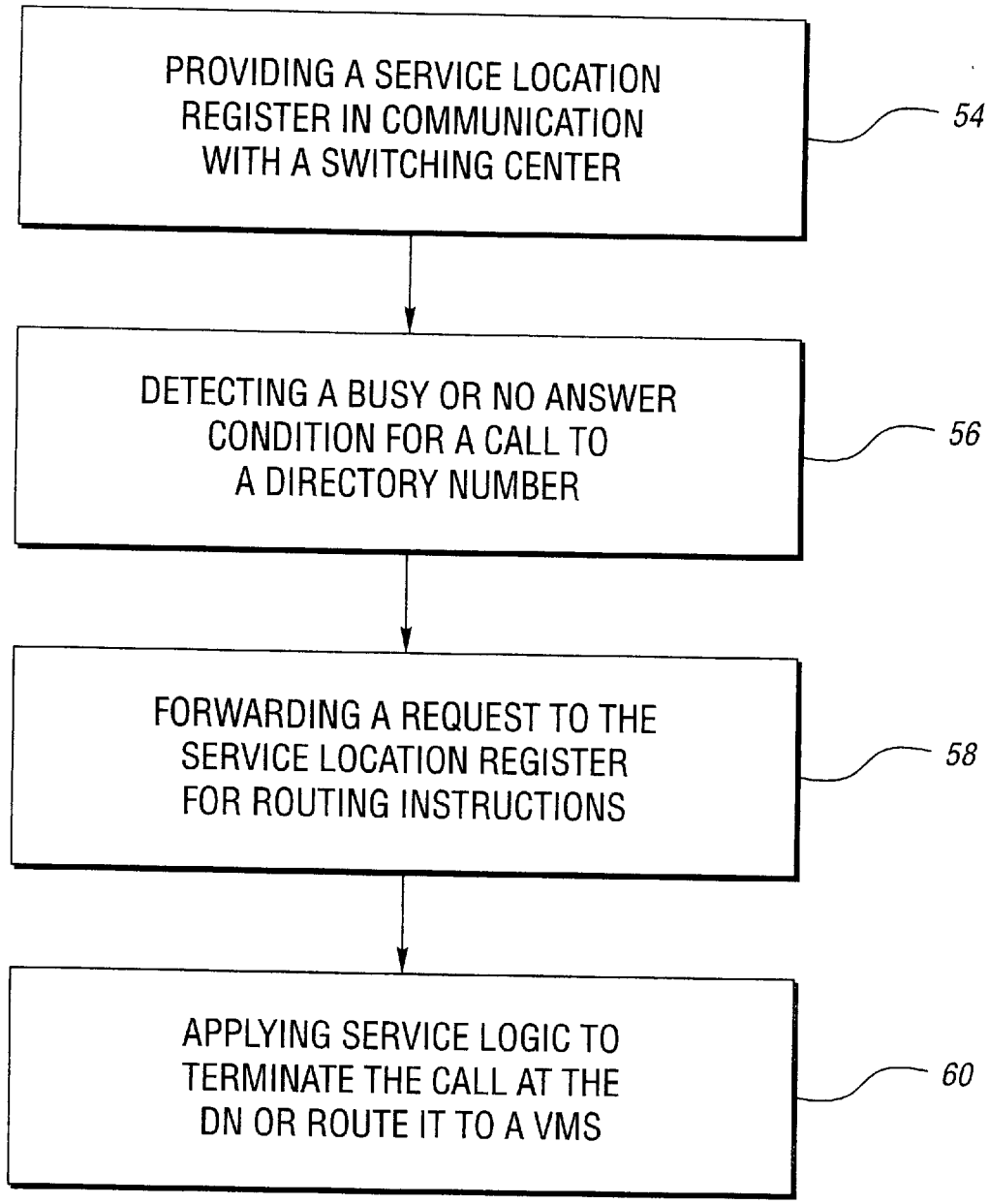

Turning now to FIG. 3 of the drawings, the method steps of the invention will be described in further detail. As indicated above, the method is adapted for use in a communication network including a switching center such as a Mobile Switching Center, in communication with at least one alternative system such as a Voice Messaging System and a plurality of subscribers, each having at least one directory Number. The method comprises providing 54 a service location register (such as a WSLR™) in communication with the switching center which is operative to retrieve stored call termination parameters for each of the subscriber Directory Numbers and call information for each incoming call to a Directory Number. The call termination parameters include call forwarding features. The method further comprises detecting 56 a busy or no answer condition for a call to a Directory Number, and forwarding 58 a request to the Service Location Register for routing instructions. Finally, the method comprises applying 60 service logic to terminate the call at the Directory Number or route the call to the at least one alternative system. In keeping with the invention, the service logic may include a determination of the day of the week, the date, the time, the number of calls already forwarded to voice mail or forwarded in a given time period, or the type of call based on the calling party Directory Number or the blocking thereof such as a business call, a personal call, a solicitation, etc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a communication network including a switching center in communication with at least one alternative system, and a plurality of subscribers, each subscriber having at least one Directory Number (DN), a method for conditionally forwarding a call, comprising:

providing a Service Location Register in communication with the switching center, the service location register operative to retrieve stored called termination parameters for each of the subscriber's DNs and call information for each incoming call to a DN, the call termination parameters including call forwarding features and the call information including calling party identification and redirecting party information, the redirecting party information including information indicating any use of an Intelligent Peripheral to redirect the call;

detecting a busy or no answer condition for a call to a DN;

forwarding a request to the Service Location Register for routing instructions; and applying service logic to disconnect the call or route the call to at least one alternative system.

2. A method as in claim 1, wherein the step of applying service logic includes determining, based on the calling part Directory Number, if the call is a business call or a personal call.

3. A method as in claim 2, wherein the call if forwarded to a first alternative system if the call is a business call and the call is forwarded to a second alternative system if the call is a personal call.

4. A method as in claim 1, wherein the step of applying service logic includes determining if the calling party Directory Number is unrestricted.

5. A method as in claim 4, wherein the call is forwarded to at least one alternative system only if the calling party Directory Number is unrestricted.

6. A method as in claim 1, wherein the step of applying service logic includes determining the time of day the call was placed.

7. A method as in claim 1, wherein the step of applying service logic includes determining the day of the week the call was placed.

8. A method as in claim 1, wherein the step of applying service logic includes determining the date the call was placed.

9. A method as in claim 1, wherein the communication network is a Public Switched Telephone Network (PSTN).

10. A method, as in claim 1, wherein at least one alternative system comprises a Voice Messaging System (VMS).

11. A system as in claim 10, wherein at least one alternative system is a Voice Messaging System (VMS).

12. A method as in claim 1, wherein the step of applying service logic includes steps of:

determining if there is a busy or no answer condition for the call to the Directory Number;

determining if the redirecting information indicates the use of an Intelligent Peripheral;

performing one of the following steps based, at least in part, upon the determining steps:

forwarding the call to at least one alternative system; and disconnecting the call.

13. For use in a wireless communication network including a Mobile Switching Center (MSC) in communication with at least one Voice Messaging System (VMS) and a plurality of subscribers, each subscriber having at least one Mobile Directory Number (MDN), a method for conditionally forwarding a call to the VMS, comprising:

providing a Wireless Location Register in communication with the MSC, the Wireless Location Registers operative to retrieve stored called termination parameters for each of the subscriber's MDNs and call information for each incoming call to a MDN, the call termination parameters including call forwarding features and the call information including calling party identification and redirecting party information, the redirecting party information including information indicating any use of an Intelligent Peripheral to redirect the call;

detecting a busy or no answer condition for a call to a MDN;

forwarding a request to the Wireless Location Register for routing instructions; and applying service logic to disconnect the call or forward it to at least one Voice Messaging System.

14. A method as in claim 13, wherein the step of applying service logic includes steps of:

determining if there is a busy or no answer condition for the call to the Mobile Directory Number;

determining if the redirecting information indicates the use of an Intelligent Peripheral;

performing one of the following steps based, at least in part, upon the determining steps:

forwarding the call to at least one Voice Messaging System; and disconnecting the call.

15. For use in a wireless communication network including a Mobile Switching Center (MSC) in communication with at least one Voice Messaging System (VMS) and a plurality of subscribers, each subscriber having at least one Mobile Directory Number (MDN), a method for conditionally forwarding a call to the VMS, comprising:

providing a Wireless Location Register in communication with the MSC, the Wireless Location Register operative to retrieve stored called termination parameters for each of the subscriber's NDNs and call information for each incoming call to a MDN, the call termination parameters including call forwarding features and the call information including calling party identification and redirecting party information, the redirecting party information including information indicating any use of an Intelligent Peripheral to redirect the call;

detecting a busy or no answer condition for a call to a MDN;

forwarding a Transfer To Number Request to the Wireless Location Register for routing instructions, the Transfer To Number Request including redirecting reason; and applying service logic to disconnect the call or forward it to at least one Voice Messaging System.

16. A method as in claim 13, wherein the step of applying service logic includes steps of:

determining if there is a busy or no answer condition for the call to the Mobile Directory Number;

determining if the redirecting information indicates the use of an Intelligent Peripheral;

performing one of the following steps based, at least in part, upon the determining steps:
forwarding the call to at least one Voice Messaging System; and
disconnecting the call.

17. For use in a communication network including at least one alternative system and a plurality of subscribers, each subscriber having at least one Directory Number (DN), a system for conditionally forwarding a call, comprising:

a switching system in communication with at least one alternative system, the switching system operative to detect a busy or no answer condition for a call to a DN and forward a request for routing instructions; and a service location register in communication with the switching center, the service location register operative to retrieve stored call termination parameters for each of the subscriber's Directory Numbers and call information for each incoming call to a DN, the call termination parameters including call forwarding features and the call information including calling party identification and redirecting party identification, the redirecting party information including information indicating any use of an Intelligent Peripheral to redirect the call, the service location register further operative to apply service logic to disconnect the call at the DN or route the call to at least one alternative system.

18. A system as in claim 17, wherein the switching system is a Mobile Switching Center (MSC).

19. A system as in claim 17, wherein the service location register is a Wireless Service Location Register.

20. A system as in claim 17, wherein the step of applying service logic includes steps of:

determining if there is a busy or no answer condition for the call to the Directory Number;

determining if the redirecting information indicates the use of an Intelligent Peripheral;

performing one of the following steps based, at least in part, upon the determining steps:
forwarding the call to at least one alternative system; and
disconnecting the call.

* * * * *